United States Patent Office 3,557,007

Patented Jan. 19, 1971

3,557,007

METHOD OF RETARDING THE EVAPORATION OF AMMONIA AND HYDRAZINE

Robert P. Cox, 5428 Lake Mendota Drive, Madison, Wis. 53705

No Drawing. Filed Nov. 29, 1967, Ser. No. 686,716

Int. Cl. C11d *3/30*

U.S. Cl. 252—152 10 Claims

ABSTRACT OF THE DISCLOSURE

The invention relates to the retardation of evaporation of ammonia and hydrazine from their liquid phases and from their aqueous solutions by the addition thereto of small amounts of alkyl amines having the formula $RNH_2$, where R is an alkyl group containing at least 12 carbon atoms.

Ammonia is frequently used as an active ingredient in products such as cleaning solutions, polishes, latices, fertilizers and the like. Due to its volatile nature, the ammonia will readily evaporate if the product is exposed to the atmosphere and the evaporation not only reduces the effectiveness of the product, but also produces objectionable odor and toxicity problems. Likewise, hydrazine ($H_2N—NH_2$) has certain applications as a fuel and propellant wherein undue evaporation causes a diminution of utility and control.

Ammonia and hydrazine evaporation can be retarded by use of physical enclosures, such as special tanks, floating spheres of inert material, or the use of relatively thick layers of foam or wax on the surface of the solution. However, these methods are suitable only for the protection of stored quantities of ammonia and hydrazine and once the sealed enclosure has been opened, the evaporation of the ammonia or hydrazine will proceed rapidly.

Certain compounds have been found in the past to be effective in retarding evaporation of water. Fatty alcohols, such as cetyl, stearyl and behenyl alcohols have been used for this purpose, but are completely ineffective when used with ammonia or hydrazine.

The present invention relates to a method of retarding the evaporation of ammonia and hydrazine from their liquid phases and from their aqueous solutions by the addition of small amounts of organic amines. By the addition of the amine, the ammonia and hydrazine are stable to volatilization during shipment, storage and use, so that the ammonia and hydrazine can be used in products such as fertilizers, propellant components, household cleansers and the like, without substantial evaporation when the product is exposed to the atmosphere in use.

As the evaporation is suppressed, the disagreeable odors of ammonia and hydrazine are eliminated and similarly, the toxicity problems caused by the evaporation of ammonia and hydrazine are prevented.

By preventing the evaporation of ammonia and hydrazine from commercial products, the products have a higher economic and market value due to the fact that they will retain their effectiveness for longer periods of time than conventional ammonia-containing products.

A further object of the invention is to render ammonia and its solutions stable to evaporation so that they can be stored, handled and used without elaborate precautions.

To achieve the objectives of the invention, a small amount of an alkyl amine having the following general formula is added to ammonia or hydrazine in their liquid phases or to their solutions:

$$R—NH_2$$

where R is an alkyl radical containing at least 12 carbon atoms and generally in the range of 12 to 26 carbon atoms.

More specifically R is $C_xH_{2x+1}$ where $x$ is an integer having a value of 12 to 26. Examples of amines which can be employed are lauryl amine, myristyl amine, palmityl amine, stearyl amine, arachidyl amine, behenyl amine, lignoceryl amine, cerotyl amine and the like.

The amount of the amine to be added to the ammonia or hydrazine is not particularly critical and can vary with the product to be stabilized and the particular amine employed. In general, the amine stabilizer is generally used in an amount of about 0.00005 to 1% by weight of the ammonia or hydrazine.

The stabilized ammonia or hydrazine can be used in a wide variety of industrial and consumer products, such as household cleaners, fertilizers, ammonia-modified polishes, waxes, latices, rocket propellants and the like. Various other materials, such as solvents, preservatives, emulsifiers, surfactants, abrasives, ignition deterrants, fillers and the like, can be incorporated in the product, depending on its particular use and application, and the addition of materials of this type will not affect the stabilization of evaporation of the ammonia or hydrazine.

The mechanism by which the amine inhibits volatilization of the amine or hydrazine, is not completely understood. It is believed that the results are due to the fact that the hydrophile-lipophile balance of the amine additive is such that it migrates rapidly to the interfaces of the ammonia or hydrazine molecules and through steric and hydorgen-bonding mechanisms, forms a tight, self-sealing mono or poly molecular "sheath" at the surface. It is further believed that the energy relations are such that the amine sheath re-forms readily after agitation and that the combination of the hydrogen-bonded amine groups and the exterior-oriented alyl groups form an excellent barrier to prevent the escape of ammonia or hydrazine molecules.

It is believed that, when a thermally agitated $NH_3$ or hydrazine molecule impinges on one of the $—RNH_2—$ moeties, its kinetic energy is absorbed and dissipated through the hydrogen-bonded surface layer. Thus robbed of the necessary energy for evaporation, the molecule "condenses" and returns to the liquid phase. It is possible that the hydrocarbon "tails" which orient away from the polar surface would present an additional barrier to absorb kinetic energy transfer from the evaporating ammonia or hydrazine molecule.

It has been found that when the amine-modified ammonia or hydrazine is agitated, the evaporation rate, during agitation, reverts almost to the behavior of the unmodified materials. Thus the ammonia or hydrazine will evaporate at almost normal rate during agitation and evaporation will cease essentially upon cessation of agitation.

The addition of the alkyl amine to the ammonia or hydrazine in its liquid phase, or in aqueous solution, substantially retards the rate of evaporation of the ammonia or hydrazine. By retarding the evaporation, the utility of the ammonia and hydrazine containing products are prolonged and the necessity for special equipment and techniques to prevent evaporation are eliminated.

As the evaporation of the ammonia or hydrazine is substantially retarded, objectionable odors are eliminated, toxicity problems in closed areas are avoided and utility of the product is enhanced.

Specific examples of the preparation of the invention are as follows:

EXAMPLE NO. 1

1000 ml. of 26% aqueous ammonia was modified by the addition of 0.1 gram of arachidyl amine dissolved in 2 ml. of tetrahydrofuran. The tetrahydrofuran functioned merely to aid in dispersing the amine and speeding up solution. After equilibrating for one hour, the solution was poured into an open dish .08 inch deep and 1.875 inches in diameter. Unmodified 26% ammonia was similarly poured into an identical dish as a control sample and the pH's of both samples were measured with the following results:

| Time (hours) | pH | |
|---|---|---|
| | Control sample | Sample containing 0.1 gm./100 ml. of amine |
| 0 | >12 | >12 |
| ½ | 10 | >12 |
| 1 | 8 | >12 |
| 2 | 7 | >12 |
| 4 | 7 | >12 |
| 8 | 7 | >12 |
| 16 | 7 | 12 |
| 24 | 7 | 11–12 |
| 48 | 7 | 11 |

This test showed that after a period of 48 hours the pH of the modified sample containing arachidyl amine was 11, indicating that only a portion of the ammonia had evaporated during the 48 hour period. In contrast to this, the pH of the control sample decreased to 7 after 2 hours, indicating that the ammonia had completely evaporated in this 2-hour period.

EXAMPLE NO. 2

A second test was conducted, similar to that of Example No. 1, except that the concentration of the arachidyl amine was decreased to .05 gram per 1000 ml. of 26% ammonia and the results of pH measurement are as follows:

| Time (hours) | pH | |
|---|---|---|
| | Control sample | Sample containing 0.05 gm. 1,000 ml. of amine |
| 0 | >12 | >12 |
| ½ | 10 | >12 |
| 1 | 8 | >12 |
| 2 | 7 | >12 |
| 4 | 7 | >12 |
| 8 | 7 | >12 |
| 16 | 7 | 12 |
| 24 | 7 | 10–11 |

The results of this test showed that .005 gram per 100 mil of arachidyl amine was extremely effective in reducing the evaporation of ammonia during a 24-hour period.

EXAMPLE NO. 3

A test similar to that of Example 1 was carried out but the concentration of the arachidyl amine was decreased to .01 gram per 1000 ml. of 26% ammonia. The pH measurements of this test were as follows:

| Time (hours) | pH | |
|---|---|---|
| | Control sample | Sample containing 0 ml of amine |
| 0 | >12 | >12 |
| ½ | 10 | >12 |
| 1 | 8 | >12 |
| 2 | 7 | >12 |
| 4 | 7 | 12 |
| 8 | 7 | 11–12 |
| 16 | 7 | 11 |
| 24 | 7 | 10 |

The results of this test indicate that the addition of .01 gram per 1000 ml. of of the arachidyl amine substantially retarded the evaporation of ammonia after a 24-hour period. By contrast, the control sample containing .01% arachidyl amine in water had a pH of about 7.

At identical concentrations, behenyl, stearyl, and palmityl amines are generally less effective than arachidyl amine in inhibiting the evaporation of ammonia from its aqueous solutions. However, cerotyl amine is generally equivalent to the arachidyl amine in retarding the evaporation of ammonia.

In commercial cleaning preparations containing detergents and other modifiers, the relative effectiveness of the amines may be slightly altered depending on the particular nature of the proprietary product.

EXAMPLE NO. 4

.01% each of arachidyl amine, behenyl amine, cerotyl amine and stearyl amine were added to separate 100 ml. samples of 50% hydrazine in water. The samples were poured into identical open dishes, and after two days at room temperature, the samples were analyzed for hydrazine content and compared to a control sample having no additive. The results were as follows:

| Sample: | Percent hydrazine after 48 hours |
|---|---|
| Control | 55 |
| Arachidyl amine | 72 |
| Behenyl amine | 72 |
| Cerotyl amine | 80 |
| Stearyl amine | 65 |

This test showed that the addition of the alkyl amines substantially reduced the rate of evaporation of hydrazine from aqueous solution.

100 grams of liquid ammonia saturated with arachidyl amine was exposed to the air to 40° F. At the end of the time that a sample of pure liquid ammonia had evaporated under identical conditions, 45 grams of the modified material still remained in liquid form.

Various modes of carrying out the invention are contemplated as being within the scope of the following claims, particularly pointing out and distinctly claiming the subject matter which is regarded as the invention.

I claim:

1. A method of decreasing the rate of evaporation of ammonia or hydrazine, comprising incorporating with a compound selected from the group consisting of liquid ammonia and hydrazine an alkyl amine having formula:

$$R—NH_2$$

where R is an alkyl group containing from 12 to 26 carbon atoms, said amine being employed in an amount of .00005 to 1% by weight of said compound.

2. The method of claim 1, wherein said compound is dissolved in essentially aqueous solution.

3. A composition of matter, consisting essentially of a volatile material selected from the group consisting of liquid ammonia and hydrazine, and having incorporated therewith an alkyl amine having the formula:

$$R—NH_2$$

where R is an alkyl group containing from 12 to 26 carbon atoms, said amine being present in an amount of .00005 to 1.0% by weight of said volatile material.

4. A composition of matter, consisting essentially of an aqueous solution containing a volatile material selected from the group consisting of ammonia and hydrazine, said solution also containing an alkyl amine having the formula:

$$R—NH_2$$

where R is an alkyl group containing from 12 to 26 carbon atoms, said alkyl amine being present in an amount of .00005 to 1.0% by weight of said volatile material.

5. The composition of claim 3, wherein said amine is arachidyl amine.

6. The composition of claim 5, wherein said amine is behenyl amine.

7. The composition of claim 5, wherein said amine is comprised of a mixture of stearyl and palmityl amines.

8. In a process of cleaning, the step of contacting an object to be cleaned with an aqueous solution of ammonia containing an amine having the generic formula R—$NH_2$ wherein R is $C_xH_{2x+1}$ and $x$ is in the range of 12 to 26, said amine being present in an amount of .00005 to 1.0% by weight of the ammonia.

9. The process of claim 8 wherein the amine is arachidyl amine.

10. The process of claim 8 wherein the amine is behenyl amine.

References Cited

UNITED STATES PATENTS

| | | | |
|---|---|---|---|
| 2,524,380 | 10/1950 | Flaxman | 252—139 |
| 3,000,723 | 9/1961 | Stevenson | 71—30 |
| 3,057,676 | 10/1962 | Wedell | 252—152X |
| 3,199,944 | 8/1965 | Gabor et al. | 21—60.5 |

FOREIGN PATENTS

| | | | |
|---|---|---|---|
| 167,031 | 4/1953 | Australia | 252—152 |

LEON D. ROSDOL, Primary Examiner

M. HALPERN, Assistant Examiner

U.S. Cl. X.R.

21—60.5; 23—190, 193

UNITED STATES PATENT OFFICE

CERTIFICATE OF CORRECTION

Patent No. 3,557,007 Dated January 19, 1971

Inventor(s) ROBERT P. COX

It is certified that error appears in the above-identified patent and that said Letters Patent are hereby corrected as shown below:

Column 2, line 28 Cancel "hydorgen" and substitute therefor ---hydrogen, Column 2, line 33, Cancel "alyl" and substitute therefor ---alkyl---, Column 4, line 20, Cancel "72" and substitute therefor ---74---

Signed and sealed this 29th day of June 1971.

(SEAL)
Attest:

EDWARD M.FLETCHER,JR.
Attesting Officer

WILLIAM E. SCHUYLER, JR
Commissioner of Patents